United States Patent [19]

Stirling et al.

[11] 3,715,515

[45] Feb. 6, 1973

[54] SHIFT-REGISTER RE-ENTRY SCANNER WITH CONFIRMATION SCAN FOR DETECTED DISPARITY

[75] Inventors: Harold James Stirling, Reading; Roger Morley Williams, Maidenhead; Peter Samuel Hampson, Leigh; James Kenneth Price, Wollaton, all of England

[73] Assignee: Plessey Handel und Investments A.G., Zug, Switzerland

[22] Filed: May 25, 1971

[21] Appl. No.: 146,687

[30] Foreign Application Priority Data

May 27, 1970 Great Britain.....................25,580/70

[52] U.S. Cl. ..............................................179/18 FF

[51] Int. Cl. ..............................................H04m 3/22

[58] Field of Search .......179/18 FF, 18 J, 7 R, 7.1 R, 179/18 ES, 15 AT

[56] References Cited

UNITED STATES PATENTS

| | | | |
|---|---|---|---|
| 3,458,659 | 7/1969 | Sternung | 179/18 J X |
| 3,444,519 | 5/1969 | Lutgenau | 340/147 |
| 3,430,001 | 2/1969 | Gianola et al. | 179/18 FF |
| 3,562,436 | 2/1971 | Lütgenau | 179/18 FF |
| 3,347,992 | 10/1967 | Sanden et al. | 179/15 AT |

*Primary Examiner*—Thomas W. Brown

*Attorney*—Scrivener Parker Schrivener & Clarke

[57] ABSTRACT

In automatic telephone exchanges of the stored-program-controlled type it is necessary for information randomly initiated at telephone peripherals (subs. line circuits, markers, junction relay sets etc) to be communicated to the central data processing equipment. The peripherals may be single or multiple signal-initiating points (e.g., relay "make" contacts which may randomly change their states). The proposal enables a single form of circuit to be used for say 96 signal-initiating points relevant to single or multiple-point peripherals or combinations thereof. The circuit comprises a shift register SR for storing the state of each signalling of the block and means S for scanning the signalling points to determine their states. The shift register and scanner are so co-ordinated as to enable the state of each point, at the time which it is scanned, to be compared with its previously stored state. If one or more changes of state are detected during the scanning cycle, the comparison cycle is repeated to confirm that a change-of-state was not of a transient nature (i.e., due to "contact-bounce") and, if the states are confirmed, connection to the data processing equipment is demanded and the states of all the signalling points (changed and unchanged) now stored in the shift register are transmitted from the shift-register as a high-speed pulse train. During transmission, a re-circulation path is provided by the register so that upon conclusion of transmission it is again available for the comparison function when scanning now resumes.

3 Claims, 6 Drawing Figures

SHIFT-REGISTER RE-ENTRY SCANNER WITH CONFIRMATION SCAN FOR DETECTED DISPARITY

The present invention relates to signalling circuit arrangements employing scanners and shift-registers for monitoring the conditions of signalling points and transmitting data appertaining to the states of the signalling points.

Although not limited thereto, the invention will find application in those kinds of automatic telephone switching systems and the like wherein the overall management, call processing, control and supervision functions of the exchange or switching-center equipment is mainly exercised by centralized, stored-programme data-processing equipment involving high-speed electronic techniques comparable with those employed in digital computers.

In general, an automatic telephone exchange using centralized stored-programme data-processing equipment incorporates a multi-stage switching network with matrix switches at each stage, and the setting-up of connections is effected under the immediate control of selectively accessible markers in accordance with information forthcoming from the data-processing equipment. Typically the matrix switches may use cross-points of the so-called reed-relay type which enable connections to be set up through the network in the order of a few milli-secs. Since the markers are local to and directly associated with the switching network it is convenient to refer to them under the general heading of telephone peripheral equipments (or peripherals). This category includes many other forms of apparatus similarly associated with the network, of which subscribers' line circuits, numbering many thousands in the case of a large subscriber exchange of a national network, will usually form the major portion; the remainder may comprise local transmission-battery feeding and call supervisory equipments, P.B.X. private branch exchange line circuits, incoming and outgoing junction circuits, digital signal receivers and senders (d.c. and/or voice frequency) incoming and outgoing trunk circuits, manual-board access circuits special service devices, conference facility circuits, and so on. In the case of automatic trunk switching centers appropriate types of peripheral devices would be involved.

All these telephone peripheral equipments, and others which may be provided, are required to transmit randomly initiated information to the data-processing equipment, and conversely the latter is required selectively to transmit information to the peripheral equipments for use in the performance of various control functions.

In the transmission of information from the peripherals to the data-processing equipment variations of two basic modes of operation are generally employed. The first which may be referred to as response-mode interrogation is such that the data-processing equipment causes the peripheral devices to be interrogated at regularly recurrent periods during which the pertinent device returns information pertaining to the current state of the device to the data processing equipment so that the latter is enabled to detect changes-of-state by comparison methods. In an automatic telephone system with a great number of peripheral equipments, of which many may have a plurality of signalling points, response mode interrogation, with the inevitable need for transmission and handling of a vast quantity of information, is considered to be economically unacceptable in the areas of the intercommunication media and the central data processing equipment.

The second method of transmission of information may be referred to as exception reporting and with this method a signalling point of a peripheral device initiates a message to the processing equipment whenever it effectively changes its state; one known form of information transmission may be referred to as single-exception reporting. An important advantage of exception reporting is that the collective amount of information passing between peripherals and the data-processing equipment is very considerably less than is the case when response-mode interrogation is used. The exception reporting technique, even of the known single-exception reporting type, therefore has meritorious aspects in respect of transmission medium and data-processing requirements, although requiring the incorporation of local logical circuitry in respect of the peripheral-equipment signalling points and the inclusion of peripheral-equipment scanners in association with signalling interface equipment serving the transmission media coupling with processing equipment. Indeed single-exception reporting may continue to find use in respect of certain types of peripheral equipments.

With single-exception reporting, logic circuitry is associated with each peripheral for detection of change-of-state of its signalling point(s), and when such a change-of-state occurs a scanner, serving the signalling points of a number of peripherals, is started. When the particular signalling point is encountered, identification is effected and a message including the identity and state of the peripheral device is duly passed to the data-processing equipment.

One important advantage of exception reporting over the response-mode interrogation technique will be evident in an environment where centralized data-processing equipment is used in the management of remote switching units, i.e., exchanges, over data links; the considerable reduction in the data traffic between the remote units and the data processing location giving rise to many technical and economic advantages.

The various kings of peripheral equipments of an automatic telephone exchange may each require to cater for different signalling requirements. For instance a subscriber's line circuit may incorporate a single signal-initiating device possibly in the form of a "make" contact of a reed-type relay which when open is indicative of the so-called "on-hook" condition and when closed implies the "off-hook" condition. On the other hand an outgoing junction relay set may have five such signal-initiating devices while others may have say eight or even more.

One point of disadvantage of a known form of single-exception reporting which militates against its general utilization is that the message "packets," transmitted in respect of different types of peripheral equipment, may vary in size with resultant complications in the processing equipment and moreover scanners of different design may be required for the various types. Another disadvantage of single-exception reporting is that it is not readily adaptable to the rapid up-dating or re-configuration of the central data-processing equipment when the latter is required to recover from possibly a major fault situation involving the loss of data relevant to its peripheral equipments.

The present invention envisages an interpretation of the exception form of reporting whereby all or many of the telephone peripheral equipments may be served by a single form of circuit unit for the collection, organization and transmission of data, with each such unit serving a block of signalling points of identical peripheral equipments or in appropriate circumstances signalling points of different peripheral equipments. The proposed interpretation will enable uniform message-packets to be used, in respect of all the relevant signalling interface equipments, for ease of handling by the data-processing equipment, and leads to the utilization of a corresponding signalling format in respect of control data incoming to peripheral equipments from the processing equipment.

Under these circumstances, with the utilization of large quantities of identical circuit units, it is proposed to manufacture them in M.O.S. LSI (large-scale integrated) circuit form, as against the use of discrete integrated circuits as previously envisaged, so that considerable cost savings will ensue.

Although the invention is intended primarily for use in relation to stored-programme controlled telephone exchanges it may also find application in other data processing environments. Moreover in the instance of a stored-programme controlled telephone exchange it is contemplated that in addition to the beforementioned telephone peripherals, so called processor peripherals would be used in the form of paper-tape readers and punches, Teletype equipments and other such relatively slow-speed devices. Here again to provide for the interplay of certain signals, between such processor peripherals and the central data-processing equipment, the utilization of arrangements envisaged by the present invention is contemplated.

Objects of the present invention are to provide a relatively simple, reliable and rationalized forms of circuit arrangement, for use at peripheral equipment locations of a data-processing equipment for use in the collection, organization and transmission of data for use in the data-processing equipment.

According to the invention there is provided a circuit arrangement for presenting information appropriate to the states of a plurality of two-state signalling points appertaining to one or more peripheral equipments serving a data processor and wherein the signalling points form a single group or a plurality of similar groups, the circuit arrangement being characterized in that it comprises a. scanning means for sequentially scanning said signalling points and operative to produce a signal appropriate to the state of each signalling point as it is encountered, b. register means including a shift-register for the or each separate group of signalling points and arranged to store the signals appropriate to the last-encountered states of all said signalling points, c. comparison means for assessing each said signal when it is produced by said scanning means in relation to the previously stored signal of the relevant signalling point and arranged to generate a change-of-state signal in the event of disparity between the currently produced signal and said previously stored signal, and d. control means which is responsive to any said change-of-state signal, to condition itself on conclusion of scanning of the group of signalling points to cause the scanning means to perform a confirmatory scanning cycle with respect to said set of signalling points, and the control means is further operative upon completion of the confirmatory scanning cycle to cause the signals stored in the shift-register or the particular one of them to be transmitted over an output path, the transmitted signals forming a data-character being appropriate to the confirmed states of the signalling points of the set.

The details of the invention will be understood from the following description of typical embodiments which should be read in conjunction with the accompanying drawings comprising FIGS. 1 to 6.

Figure 4:
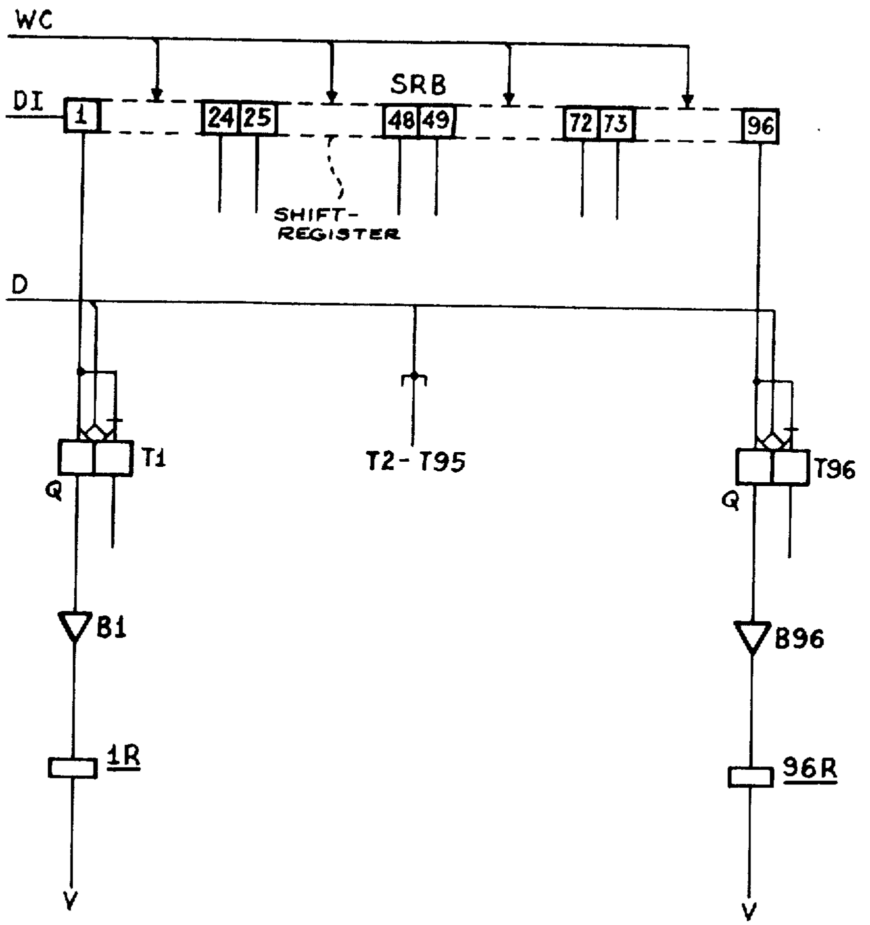
Figure 5:
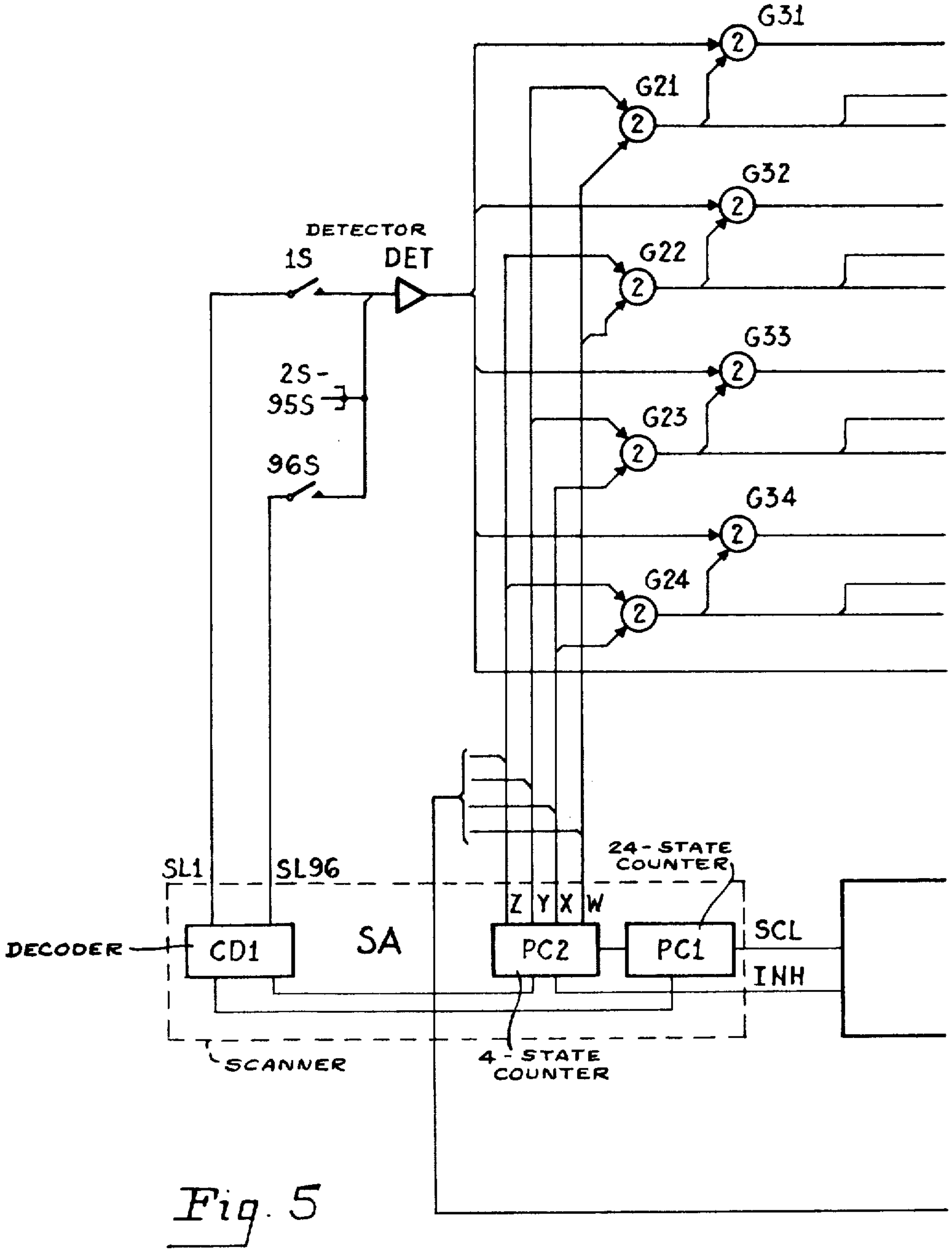
Figure 6:
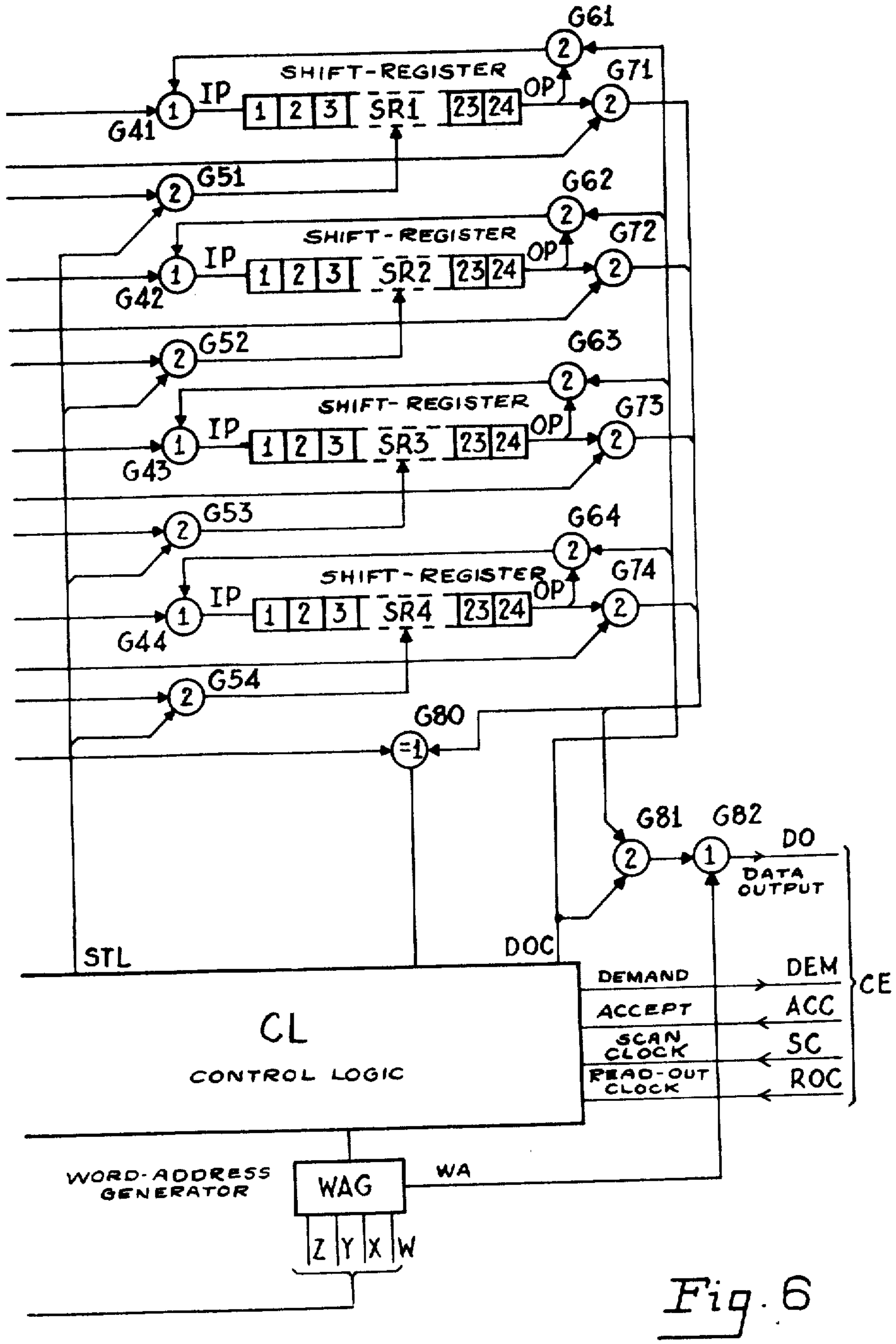

FIG. 4 shows circuit arrangements suitable for the handling of data forthcoming from the data-processing equipment for the control of response devices, typically relays, contained in peripheral equipments; the techniques and data formats being compatible with those involved with transmission of data to the data-processing equipment in respect of peripheral signalling points, and FIGS. 5 and 6 show another modified form of circuit arrangement catering for block-exception reporting in what may be termed, a segmented form.

Certain of the circuit diagrams to be described incorporate well-known forms of gates, and these are symbolized by circles with arrow-headed input leads. In each case a gate carries a reference G with a numerical suffix, and the numeral within the circle is indicative of the function of the gate. Thus an AND gate is signified by the enclosed numeral corresponding to the number of input leads and the inference is that with all input leads at "1" the output lead is also at "1" but with either or all of the input leads at "0" the output is "0." A simple OR gate, having a plurality of input leads and illustrated with an enclosed numeral "1," produces a "1" output when either or both of the input leads are at "1" and produces a "0" when both input leads are at "0." The third type of gate employed (i.e., gate G5 of FIG. 1) is identified by "= 1" within a circle and performs an "exclusive-OR" function in that it produces a "1" output when either of its input leads is at "1" but gives a "0" output when all (i.e., both) input leads are "1" or "0."

Inverters, identified by the reference I and a numerical suffix are also employed, and in each case a "1" or "0" input produces a "0" or "1" output respectively.

DATA COLLECTION AND TRANSMISSION

Figure 1:
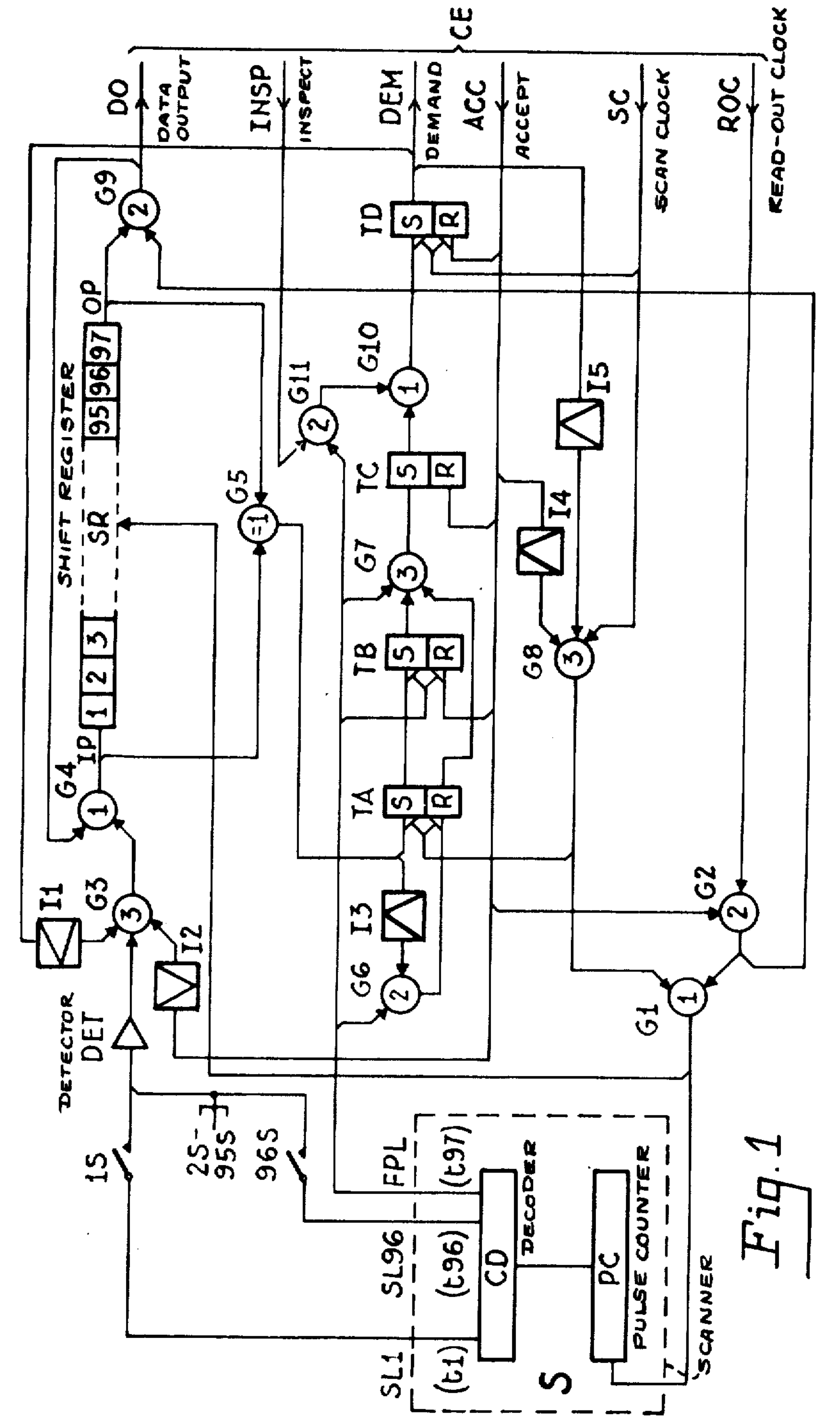
FIG. 1 shows one proposed so-called block-exception reporting circuit arrangement used in conjunction with 96 peripheral-equipment signalling points in the typical form of electromagnetic relay "make" contact units.

Referring to FIG. 1, this circuit is concerned with a block of 96 telephone peripheral signalling points in the form of "make" contact units 1S to 96S, which may be considered as being incorporated in separate relays, say of the so-called reed-contact type, provided on the basis of one for each of a group of 96 telephone subscribers' line circuits. The circuit together with further equipment, connected over path CE and conveniently to be referred to as the control equipment, constitutes signalling-interface equipment capable of associating the typical telephone exchange peripheral equipments (in this instance subscribers' line circuits) with data processing equipment arranged to exercise overall management and control of automatic telephone exchange, or network of exchanges, serving many thousands of subscribers.

In addition to various types of gates and the inverters, the circuit comprises, a) toggles TA, TB, TC and TD of which all except TC are of the so-called JK type, (b) a pulse operated scanner, S, formed by a 97-state pulse counter PC and decoder CD, and c) a 97-stage shift-register SR.

SCANNING FUNCTION

The scanning function in respect of the contact units 1S to 96S, which are connected to the first 96 output leads SL1 to SL96 of decoder CD respectively is performed under control of the scan clock-pulse source SC which delivers regularly repetitive pulses to the pulse counter PC and to the shift register SR via the AND gate G8 and the OR gate G1. In the present instance of subscribers' line circuits the repetition rate of the scan clock-pulses may be of the order of 1 to 2 millisecs. The pulses are of rectangular configuration and are effective upon the shift-register as strobe pulses; the shift-register performing its registration and shifting functions on the trailing edge of each pulse. The cyclic pulse counter PC of the scanner, having 97 states-of-count (1 to 97), changes its state as a result of each clock-pulse and is typically a seven-stage binary counter with appropriate logical feed back arrangements. As counting proceeds cyclically, conditions appropriate to each state-of-count are applied to the decoder CD so that pulses are extended singly and successively to the 97 leads SL1 . . . SL96 and FPL in that order; the whole process being repetitive for as long as the scan clock-pulse source remains operative upon the pulse counter. It can be deduced that during time-slots $t1$ to $t96$ respectively of each cycle, contact units 1S to 96S are interrogated as to their open or closed states, and that at time-slot $t97$ a so-called frame pulse is developed at lead FPL extending to gates G6, G7 and G11 and to toggle TB. On the present assumption that the contact units are included in subscribers' line circuits, it can be taken that the alternative open and closed states of a contact unit are indicative of the "on-hook" and "off-hook" conditions of the telephone instrument appertaining to the particular subscriber's line circuit.

The right-hand sides of contact units 1S to 96S are commoned to a known type of detecting device DET which has a rapid response in spite of capacitative characteristics of the network involving the contact units. The output of the detector is connected over AND gate G3 and OR gate G4 to the input lead IP of the shift register and to one input lead of the exclusive-OR gate G5. Gate G5, by having its other input lead connected to the output lead OP of the shift register, is enabled to compare data ("1" or "0") which is about to be injected into the shift register with data already stored in the last stage (97) of the register. It is to be noted that when a contact unit is being scanned, the state of stage 97 of the register appertains to the state of that contact unit when it was last scanned.

During the course of any scanning cycle, the pulses developed successively at leads SL1 to SL96, in time slots $t1$ to $t96$ respectively, are effective in producing a "1" or "0" signal according to whether the pertinent one of contact units 1S to 96S are encountered in the closed or opened state respectively and, since gate G3 is not inhibited, the signals are reproduced at the input lead of the shift register. Inevitably the signal applied to the input lead at time slot $t97$ is "0" since no contact unit is scanned at that time. In each case the input signal is stored, and the shift function of the register performed, on the trailing edge of the clock pulse applied to scanner and shift-register.

Ignoring the effect of the exclusive-OR gate G5 it can be taken that upon completion of a scanning cycle, i.e., on termination of the $t97$ pulse, the encountered states of contact units 1S to 96S will have been stored in state 97 to stage 2 respectively of the shift register. Moreover stage 1 of the register will have stored "0" corresponding to the frame-pulse time-slot $t97$.

Assuming that no change-of-state of contact units 1S to 96S has been encountered during the now completed scan, (as evidenced by toggles TA, TB, TC and TD remaining in the reset states) a further scanning cycle is commenced. During time-slot $t1$, i.e., while the appropriate scan clock-pulse is present at the input of the pulse counter PC "1" or "0" is received at the shift register input lead according to whether contact unit 1S is encountered in the closed or open state. If there has been no change-of-state of this contact unit since its previous interrogation, the signals at the input IP and output OP leads of the shift-register are identical and the output lead of gate G5 remains at "0." On the other hand if such a change has taken place the register input and output lead conditions are different ("1" and "0" respectively for contact closure, or "0" and "1" respectively for contact opened) and therefore G5 produces a "1" output. In any event on termination of the current clock-pulse the shift-register advances one step whereby the input signal appropriate to the encountered state of contact unit 1S is stored in stage 1, and the stage 97 assumes a state appropriate to that of contact unit 2S as it was encountered in time $t2$ of the preceding scan cycle. It follows that during time-slot $t2$ of the present cycle, the encountered state of contact unit S2 will be compared, by gate G5, with its state as determined during the course of the preceding scan cycle.

The orderly comparison and registration procedure continues with respect to all the contact units; the comparison function with respect to the last contact unit (96S) being effected when the decoder CD is delivering a pulse to lead SL96 during time-slot $t96$. It is to be noted that at time-slot $t97$ a pulse obtaining at lead FPL is applied to gates G6 and G7 and to the strobe input lead of the JK-type toggle TB; the strobe input leads of the similar toggles TA and TD being served by the scan clock-pulse source SC.

If no change-of-state is encountered during the cycle the whole procedure is repeated. However during the course of the present scanning cycle, a change-of-state of any one or more of the contact units may be detected, and for each change-of-state the exclusive-OR gate G5 will make an announcement by delivering a "1" signal to the set-side (S) input lead of toggle TA. The first or only change-of-state, so announced during the scanning of the contact units, therefore results in the priming of the set-side (S) input lead of toggle TA, so that the toggle is enabled to be set on termination of the current clock-pulse. Under these circumstances the set-side input lead of toggle TB has a "1" signal applied to it. Any subsequent changes-of-state announced during the scanning cycle would serve only to confirm the set states of toggle TA.

During time-slot T97 of the particular scanning cycle, the pulse evident at lead FPL ("1") is applied to one of the input leads of gate G6, and also to one input lead of gate G7 and to the strobe input lead of toggle TB. At this time gate G5, having both input leads at "0" due to the current and stored time-slot *t*97 conditions, is delivering "0" to the input of inverter I3 so that "1" is presented to the second input lead gate G6. With both its input leads at "1," gate G6 applies a "1" priming condition to the reset side of toggle TA, so that the latter duly assumes its reset state under control of the scan clock-pulse source. Upon the termination of the pulse (time-slot *t*97) at lead FPL, toggle TB is set but the output of gate G7 remains "0."

The situation appertaining on termination of the frame pulse which occurred in time-slot *t*97, following a scanning cycle appropriate to a change-of-state of at least one contact unit, is that all the last encountered states of the contacts S1 to S96 are stored in stage 97 to 2 respectively of the shift register, and of the four toggles TB alone is in the set state.

CONFIRMATORY SCANNING FUNCTION

Another 97-period scanning cycle which may be referred to as the confirmatory cycle is now performed. As before this cycle is under control of the scanning clock-pulse source SC and again the comparison and registering functions are executed in respect of the 96 successively interrogated contact units. If no further change-of-state of any of the contact units is announced during the period embraced by time slots *t*1 to *t*96, the exclusive-OR gate G5 is not activated and therefore toggle TA remains reset. With toggle TA reset and toggle TB set, the pulse occuring at lead FPL during time slot *t*97 satisfies G7. The latter therefore (at the leading edge of the pulse at lead FPL) applies "1" to the set-side input lead of toggle TC (S-R type) which now assumes the set condition, and thereupon applies a priming condition, over the OR gate G10, to the set side of toggle TD. Toggle TD is set upon termination of the current scanning clock pulse (lead SC), and accordingly a sustained "1" signal is applied to demand lead DEM of the associated control equipment.

The "1" output of toggle TD is also applied to inverters I1 and I5 so that inhibit conditions "0" are connected to appropriate input leads of gates G3 and G8. With gate G3 inhibited contact units 1S to 96S are isolated from the shift register, whereas with gate G8 inhibited, the scan clock-pulse source SC is isolated from toggle TA, the pulse counter PC and the shift register SR.

The primary purpose of the confirmatory cycle is to virtually eliminate the possibility of eventual transmission of data which may have registered during the preceding scanning cycle, as a result of transient "-noise" in the interrogation network or as a result of interrogation of a contact unit while in an unsettled condition, say due to "contact-bounce."

Accordingly if the confirmatory cycle results in any change-of-state being detected, whether this is validly originated in respect of another of the contact units changing its state after interrogation during the previous scan, or it arises out of previous detection of an unsettled condition, (e.g., contact bounce) toggle TA is again set as a result of the accouncement of the change-of-state. Therefore after completion of the present cycle toggle TB is reset and a further confirmatory cycle is performed, preparatory to possible transmission of data to the data processing equipment in respect of the block of contact units. It is to be noted that the incidence of changes-of-state of the various contact units of the block and the incidence of actual registration of invalid unsettled conditions is such that in general only one confirmatory cycle is performed; two such cycles being exceptional.

DATA TRANSMISSION

It may be taken that the effect of the signal at the demand lead DEM, when a confirmatory cycle has been completed without change being encountered, is such that the control equipment promptly requests the service of any appropriate input/output unit of the processing equipment, selectively sets up a connection to the allocated unit and causes the serial transmission to the processing equipment of data (24-bit word) representative of the address corresponding to the identity of the block of 96 contact units served by the above-described circuit. When the address data has been transmitted, a sustained "1" signal is forthcoming at the accept lead ACC. This causes toggle TC to revert to the reset state so that the demand signal, at lead DEM, is duly inhibited by the resetting of toggle TD under the control of the scanning clock-pulse source SC. Meantime the "1" signal at lead ACC maintains inhibition of gates G3 and G8, now by way of inverters I2 and I4. The "1" signal at lead ACC also conditions gate G2 to respond to a train of 97 read-out pulses now forthcoming at lead ROC. The read-out pulses, having a repetition rate of say 2 micro-secs., (i.e., the bit-rate of the data-processing system) and used a) to drive the scanner which, due to the inhibited state of gate G3, is now ineffectual as regards interrogation of the relay contact units, b) to strobe the shift-register, and c) to enable the data-output lead DO to be activated, under control of gate G9, according to output signals derived from the shift register; gate G9 having one input lead controlled by gate G2 which is conditioned to reproduce pulses delivered by the read-out clock-pulse source ROC. It is to be noted that lead DO is connected to an appropriate input lead of the OR gage G4 so that gates G4 and G9 constitute the data re-circulation path of the shift-register.

At the end of the previously described confirmatory cycle, stages 97 to 2 of the shift register each contain "1" (contact unit closed) or "0" (contact unit open) according to states of all the contact units 1S to 96S respectively even though only one of them may have initiated a change-of-state announcement during the preceding scan cycle.

During the period of the first of the 97 read-out pulses now forthcoming at lead ROC, the "1" output of gate G2 is applied to an input lead of gate G9. The other input lead of gate G9 is connected to the output lead OP of the shift-register which is presently conditioned according to the stored state of contact unit 1S, i.e., stage 97 is at "1" or "0" indicative of closed or open contact state respectively. Therefore, under control of gate G9, the data output lead DO goes to "1" or remains at "0" as the case may be, and it follows that for the duration of the first read-out pulse, the signal transmitted to lead DO, and thence to the data-processing equipment, is representative of the stored state of contact unit 1S. Gate G4 ensures that the state of the register input lead is identical with that of lead DO.

The first read-out pulse (lead ROC) like all succeeding pulses, is also extended over gates G2 and G1 to the pulse counter of the scanner and to the shift-register. The shift-register is advanced one step on termination of the first read-out pulse so that stages 1 and 97 assume states appropriate to the previously stored conditions of contact units 1S and 2S respectively.

When the second read-out pulse is received at lead ROC, gate G9 transmits a stored data-bit, appropriate to the stored state of contact unit 2S, to the data output lead DO, and moreover this condition is extended by gate G4 to the input lead of the register for storage in the stage 1 thereof upon termination of the read-out pulse.

As a result of continuation of the read-out pulses, the transmission of data appropriate to the remaining contact units 3S to 96S proceeds, and concurrently the data is re-circulated through the shift register. Accordingly on termination of the 96th read-out pulse data relevant to contact units 1S to 96S will have been transmitted over the data lead DO, and the state of the register has become such that its stages 96 to 1 contain the data relevant to those contact units respectively; stage 97 containing "0" which was a storage condition acquired originally by the shift register during a scanning time slot *t*97. The data output lead DO, having already received data relating to the contact units, is therefore in the "0" state, and this condition persists subsequent to the last i.e., 97th, read-out pulse due to inhibition of gate G9. On termination of the 97th pulse the final advancement and re-circulation function of the shift register is performed so that ultimately data relevant to the last interrogated states of contact units 1S to 96S is again contained in stages 97 to 2 respectively, whereas stage 1 again contains "0."

Meantime the scanner, although rendered ineffectual by inhibition of gate G3, has been driven by all the read-out pulses so that on termination of the last read-out pulse, both the scanner and the shift register are ready for resumption of scanning of the contact units.

Immediately data transmission has been completed the "1" condition is removed from the accept lead, ACC, by the control equipment so that the inhibit conditions are removed from gates G3 and G8, and the priming conditions are removed from the reset input leads of toggles TB, TC and TD. With toggles TA, TB, TC and TD all in the reset condition, effective scanning of the contact units will now be resumed in the usual manner under control of the scan clock-pulse source SC. Accordingly sequential scanning of the contact units continues, cycle-by-cycle with the attendant register-shifting functions, until completion of a cycle during which at least one contact-unit change-of-state is encountered, whereupon the confirmatory sequence is initiated and, when one such sequence has been completed without a contact-unit change-of-state being announced and registered, another demand for access to the data processing system is instituted preparatory to transmission of data appropriate to the recorded states of all 96 contact units of the block.

The data transmission arrangements described above may be modified to the extent that the external control equipment is not required to apply a specific number of read-out pulses to lead ROC. Instead continuously repetitive pulses would be evident at that lead and the circuit shown in FIG. 1 would be so adapted that, immediately upon completion of message transmission, the demand signal is removed from lead, DEM, whereupon the accept lead, ACC, is caused to revert to the "0" state to enable the normal scanning functions to be resumed from that point. With such arrangements, circuits such as FIG. 1, in its modified form, but having different sizes of scanners (e.g., some for 48 signalling points and others for 96 signalling points) are readily catered for. With the particular modification envisaged, the driving of the scanner (at the relatively high speed) during data transmission may be avoided.

ALTERNATIVE LINEAR SCANNING MEANS USING GATE PER CONTACT UNIT

Figure 2:
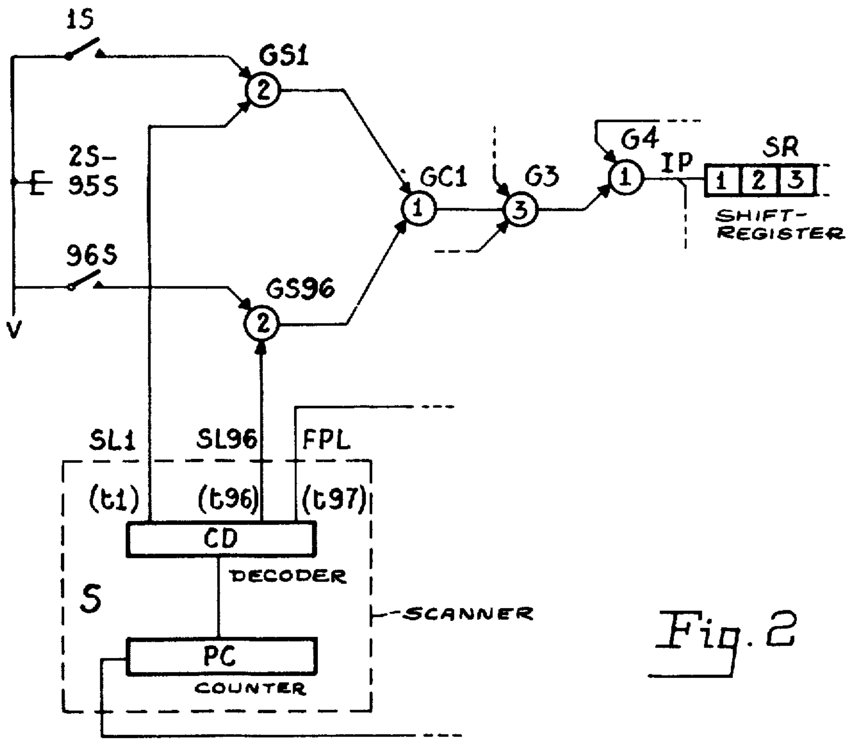
FIG. 2 illustrates means for linearly scanning 96 signalling points which may be used as an alternative to the linear scanning means incorporated in FIG. 1.

FIG. 2 shows an alternative to the contact-unit interrogating portion of FIG. 1. In FIG. 2 the lefthand side of the 96 "make" contact units 1S to 96S are connected to a "1"-significant d.c. voltage source V; the other side of each unit being connected to one input of an individual 2-input AND gate, GS1 to GS96 respectively. The output leads of gates GS1 to GS96 converge (possibly through a network of OR gates) upon the OR gate GC1, whereas the second input lead of each of gates GS1 to GS96 is served by one of leads SL1 to SL96 respectively which emanate from the decoder CD of the scanner S. The scanner is identical with that of FIG. 1 and controlled in the same manner. As in the case of FIG. 1, during each 97-point scanning cycle, leads SL1 . . . SL96 and FPL receive pulses at time-slots *t*1 to *t*97 respectively, and it is to be noted that lead FPL is connected in identical manner to that of FIG. 1, i.e., to toggle TB and to gates G6, G7 and G11. Gates G3 and G4 are associated with the input lead of the shift register SR as in FIG. 1, but one input lead of gate G3 is connected to the output lead of gate GC1 instead of being served by the detector DET as previously. In all other respects the arrangements involving FIG. 2 would be identical to those of FIG. 1.

During scanning of the contact units, any scanning pulse applied to a gate GS1 to GS96 determines the output of that gate as "1" or "0" according to whether the related contact unit is in the closed or opened state respectively, and this condition is repeated at the input of the register for change-of-state assessment in the manner already described; the currently encountered contact-unit state, in each case, being registered by advancement of the shift-register on cessation of the current scan clock-pulse.

CO-ORDINATE SCANNING SCHEME

Figure 3:
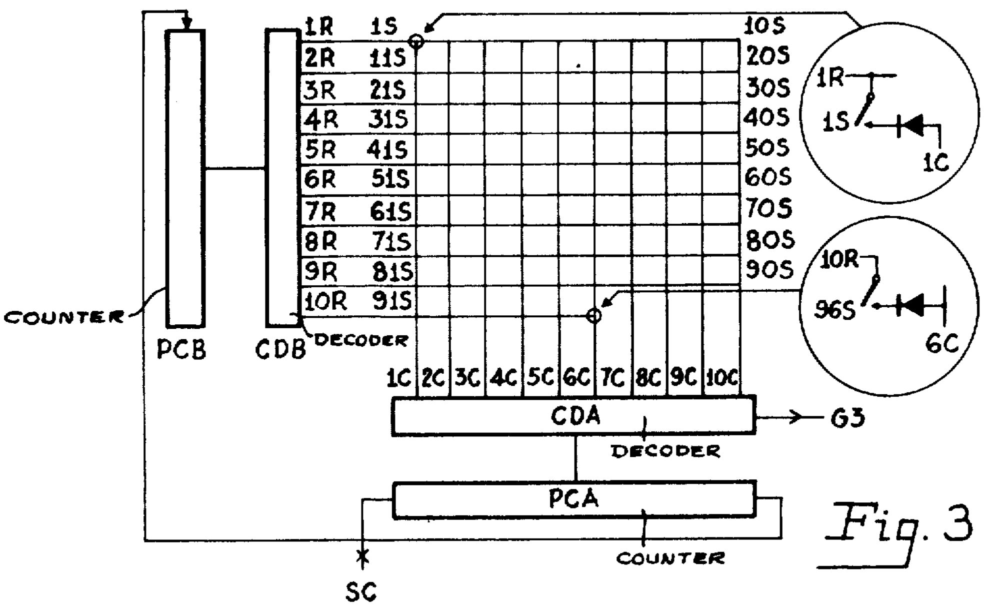
FIG. 3 depicts a co-ordinate scanning means which may be used as a further alternative to the relevant portion of FIG. 1.

As an alternative to linear scanning of the contact units as outlined in FIGS. 1 and 2, co-ordinate scanning may well be employed. FIG. 3 depicts such a co-ordinate scanning arrangement. This involves two 10-state pulse counters PCA and PCB with related 10-state decoders CDA and CDB. During scanning, counter PCA is driven directly from the scan clock-pulse source SC and is connected to counter PCB in such wellknown manner that the latter is driven at 1/10 the rate of counter PCA. The successive states of counters PCA and PCB are extended to decoders CDA and CDB so that the ten leads of 1C to 10C (column leads) and 1R to 10R (row leads) as appropriate, are rendered operational progressively under control of the clock pulses. Each of the 96 contact units 1S to 96S, which are to be subjected to the scanning function, is connected, in series with an individual isolating diode, between an appropriate pair of column and row leads, as typified by the detailed representation of the first and last contact units. Each row wire, when individually activated, has a pulse evident at it, whereas when a column wire is activated the decoder CDA is conditioned to respond to a pulse which may be forthcoming to that column wire. As a result of each such incoming pulse, signifying the closed state of a co-ordinately-scanned contact unit, the decoder DCA is arranged to extend a "1" signal to the shift-register input lead over a path involving gates G3 and G4 as in FIG. 1.

It will be obvious that when the 10 × 10 co-ordinate scanner is substituted for the 97-point linear scanner in FIG. 1, the counters PCA and PCB would be so interconnected as to provide for resetting themselves immediately the requisite 97 output conditions have been produced by the scanner.

All the various scanning schemes alluded to, and indeed the general circuit arrangements, pre-suppose that blocks of 96 signal contacts are to be catered for. This need not necessarily be so and indeed this number was chosen with system security requirements in mind, and because the number is convenient in the grouping of subscribers' line circuits in relation to a proposed switching network. Moreover it is convenient for working into a proposed data-processing equipment catering for data-word stores of 24 bits; a 96-bit data transmission sequence being readily accommodated in four such data-word stores. In this connection it may be pointed out that in the transmission of data to the data-processing equipment each read-out pulse sequence, instead of comprising 97 regularly repetitive pulses as the case may be, may well be changed so that extended pauses are evident after the 24th, 48th, and the 72nd pulse. Under these circumstances a data transmission sequence would be effectively divided in four 24-bit data-words.

Although the foregoing description has assumed that the peripheral-equipment signal-initiating points take the form of relay contact units of the "make" type, the various interpretations of the invention are equally applicable to other forms of signalling devices including electronic switching devices.

The various interpretations of the data collection, organization and transmission circuit has been described in relation to a block of 96 identical peripheral equipments typically subscribers' line circuits, each represented by a single signal-initiating point, it is equally applicable to other types of peripheral devices having more than one signal point each. Thus the device can be used to serve 48 peripherals with two signalling points each, or again typically it may be used in relation to 16 peripherals each with six signalling points. Similarly if peripheral devices with 24 signalling points were to be used, four such devices could be catered for by one such circuit. Another important attribute of the circuit described is that it can readily accommodate peripheral devices having different numbers of signalling points without wastage of scanner capacity, for instance the 96 point scanner and the related apparatus could serve 13 peripherals with seven signalling points each and instead of wasting the remaining five points of the scanner, these could be utilized for another peripheral with five signalling points or for several peripherals having a total of five signalling points.

Different types of peripherals in a telephone system may require to be scanned at different rates; and this is readily accommodated by the association of scan clock-pulse sources having suitable repetition rates with the relevant data collection, organization and transmission circuits. It will be realized that where the facility of accommodating different types of peripherals in 96-point units is resorted to, some foresight is to be exercised to ensure that in each case a scan clock-pulse source, having a repetition rate appropriate to all the relevant signalling points, is employed.

In some environments the confirmatory scanning feature may be considered unnecessary, and under these circumstances the circuit is modified by a) removal of toggle TA, inverter I3 and gate G6, b) connecting the output lead of the exclusive-OR gate G5 to the set-side input lead of toggle TB and c) placing the strobe-input lead of toggle TB under exclusive control of the scan clock-pulse source SC. With this arrangement, the first or only contact-unit change-of-state encountered during scanning causes toggle TB to be set on termination of the current clock-pulse. With toggle TB set, a priming condition is applied to gate G7 (now a 2-input gate). When the encountered states of all the contact-units have been registered, the occurrence of a pulse at lead FPL (time-slot $t97$ of the cycle) causes toggle TC to be set by gate G7. Toggle TD is duly set as before to present a demand signal to lead DEM, and from this point the circuit performs in the manner already described in that a) scanning is inhibited and b) the accept signal duly received at lead ACC is effective in resetting toggles TB and TC and in causing the data-transmission cycle (with concurrent re-circulation of the shift-register data) to be executed under control of the read-out clock pulses; the circuit reverting to its scanning function immediately transmission has been completed.

CONTROL OF PERIPHERAL-DEVICE RESPONDING MEANS BY RECEIVED DATA

The circuit outlined in FIG. 4 enables 96 electromagnetic relays, dispersed amongst different peripheral equipments, to be controlled in accordance with data forthcoming from the central data-processing equipment. It can be taken that access is gained to the relay-control circuit, over the path comprising conductors WC, DI and D by address information presented by the data-processing equipment to apparatus together with the relay-control circuit form the signalling interface equipment. In general the telephone peripheral equipments each incorporate more relays, for control in accordance with incoming data, than the previously mentioned signalling points, e.g., contact units, and although the typical relay-control circuit may have equal-size groups of relays relating to peripherals of one type confined to it, this is not essential, and to avoid wastage of control capacity two or more groups of different sizes may be accommodated.

The relay-control circuit comprises a 96-bit shift register SRB controllable in respect of its registration and data-shifting function from a write clock-pulse source extendable over lead WC. Each stage of the shift register has an output lead connected to the input lead of an appropriate one of 96 D-type toggles T1 to T96. The output leads Q of each toggle extends, over an appropriate one of buffer devices B1 to B96, to one end of the operate coil of one of the relays 1R to 96R; the coils having their other ends connected to the potential source V.

The relays incorporated individually or in groups in the relevant peripherals, may be of the so-called reed type having operate times of the order of 1 milli-sec.

In the quiescent state of the control circuit, the various relays individually will be in the operated or released state according to the set or reset condition respectively of the relevant toggle and this will have been determined in accordance with contents of a 96-bit data message previously serially received by, and currently stored in, the shift register. The advent of a new message requiring the changing of state of any one or any number of the relays of the block of 96 is preceded by the reception, ineffectually, of a "1" signal at the demand lead D, serving the strobe input leads of all the toggles. The 96-bit data message is then presented serially to the data input lead DI and this is accompanied by a sequence of 96 clock-pulses at the write lead WC. The data pulses and the clock pulses occur at a bit-rate determined by the transmission rate of the data-processing equipment, e.g., of the order of 500 Kb/s.

When all the "1" and "0" bits of the message have been stored in the shift register, the 96 output leads thereof are conditioned appropriately. If, for example, "1," is now evident at the output lead of stage 1, this infers that relay 1R if already operated (toggle T1 already set) will be required to remain so; whereas if it is unoperated (toggle T1 reset) it will be required to be changed to its operated state. On the other hand a "0" output from stage 1 would infer that the relay is to remain unoperated or is to assume the unoperated state. Similar conditions obtain in respect of the remaining register output leads as regards relay control requirements.

Immediately following completion of reception and storage of the present data message, the demand lead D reverts to the "0" condition to simultaneously strobe the toggles. Accordingly that, or each, toggle which relates to a shift-register stage that is now in a changed state (compared with that which appertained after the previous message) is caused to appropriately change its state. This change-of-state of the toggle effects operation or release, as applicable, of the pertinent relay and this state of affairs persists since the toggle maintains itself in its new state.

Subsequently received data messages are dealt with in the same way. It may be mentioned that the buffer devices B1 to B96 are included to enable "1" signals derived from the toggles to be converted to levels appropriate to effective control of the electromagnetic relays. If it can be assured that the operate and release times of the relays are such that they exceed the reception time of a data message, then it becomes possible to eliminate the toggles and control the relays directly from the output leads of the shift register.

Although the control circuit has been described with reference to the control of electromagnetic relays it is equally applicable to the control of other switching devices of an electronic nature.

Also it has been assumed, in respect of FIG. 4, that data messages are each injected as continuous 96-bit streams each with a sequence of 96 write clock-pulses. This is not necessarily so since the message may for example be organized in 24-bit sections with pauses between them. Indeed the pauses may be effected by one or more spacing bits between the message sections and in this case additional shift-register stages would be introduced to absorb the spacing bits.

As in the case of previously described circuits, the relay-control circuit being intended for use in large quantities in an automatic exchange environment would be fabricated in L.S.I. form with attendant cost advantages.

TESTING AND FAULT RECOVERY PROCEDURES

In a telephone system controlled by data-processing equipment, it is essential for satisfactory working (as in many other data-processing environments) that the data-processing equipment shall be cognisant of the prevailing states of the signalling points of the peripheral devices. Accordingly it is desirable that, from time-to-time, a routing test procedure should be instituted to determine that the data-processing equipment and requisite signalling points are in conformity and to enable the data processing equipment to be updated in the case of disparity. It is also desirable that the data-processing equipment should be arranged to institute such a procedure automatically when a situation develops under which it is not certain as to the state of one or more signalling points. The circuit arrangements of FIGS. 1 and 4, with the variants alluded to, are applicable to the circumstances mentioned and indeed the numerous such circuit arrangements of the exchange are available to enable rapid recovery from a major failure of the data-processor to be effected should this occur.

In FIG. 1, AND gate G11 and OR gate G10 are provided to meet the particular requirements. Gate G11 is jointly controlled from the "inspect" lead INSP and from lead FPL (time-slot T97) of the scanner, whereas gate G10 is controlled by the output of G11 in addition to the "set" output of toggle TC. When the processing equipment requires advice as to the states of the peripheral signalling points served by the block-exception reporting circuit, it causes a "1" condition to be applied to lead INSP. Accordingly, at the end of the current cycle being performed by the scanner, the pulse developed at lead FPL (time-slot T97) causes a '1' input to be applied to gate G10, regardless of the states of the toggles. Gate G10 thereupon applies "1" to the set-side input lead of toggle TD.

Meantime scanning pulses are forthcoming over lead SC of the control equipment, and the next termination of a scanning pulse is effective in setting toggle TD which as already described a) institutes a demand at lead DEM of the control equipment for connection to an input/output unit of the data processing equipment, and b) disables gates G3 and G8. The usual transmission procedure is now promptly performed (without intervention of a confirmatory scanning sequence) under control of read-out pulses forthcoming at lead ROC; the procedure involving transmission via lead DO of the states of the 96 signal points as stored in the shift register while the latter is being subjected to the re-circulation process.

Preferably a distributor circuit arrangement such as that shown in FIG. 4 is used for the activation of lead INSP of the typical information-collecting circuit (FIG. 1) in that a predetermined stage of the shift register SRB of a particular distributor would be employed for marking the lead. When the data input cycle (including injection of "1" to said stage) has been completed, the contents of the shift register are transferred to the toggles T1 to T96. The particular toggle effects operation of the relevant reed-contact relay (1R to 96R) and this applies the marking to lead INSP.

As an alternative to using lead INSP to cause the information collecting circuit (FIG. 1) to transmit the registered states of the signalling points, one of the signalling points (1S to 96S) may be substituted by a contact unit of one of the relays 1R to 96R of the distributor (FIG. 2). With this arrangement when the data processor requires to check or be up-dated as regards the signalling points of the group, it takes the particular distributor into use, injects "1" into the relevant stage of shift register SRB so that this duly causes the particular relay contact-unit to close. The change-of-state is registered in the appropriate stage of shift-register SR (FIG. 1) and announced in the normal way, so that when the relevant scanning cycle and a satisfactory confirmatory cycle have been completed, the whole of the contents of the shift register are transmitted to the data processing equipment in the manner already described.

The scheme just outlined is advantageous in respect of routine testing of the signal-collecting circuit insofar as a considerable portion of the block-exception reporting circuit is involved in the procedure. On the other hand, the capacity of the circuit, as regards working signalling points, is reduced and of course inclusion of a confirmatory scanning cycle makes the procedure somewhat slower than the previously described scheme which is eminently suitable for updating requirements as distinct from routine testing.

SEGMENTED BLOCK-EXCEPTION REPORTING SCHEME

The block exception reporting schemes involving FIGS. 1 and the variants alluded to in respect of FIGS. 2 and 3 contemplate the transmission of information in respect of complete block of typically 96 signalling points even when a change-of-state of a single signalling point of the block is encountered. In some instances this technique may be undesirable and accordingly the invention envisages a modified scheme represented in FIGS. 5 and 6. As in FIG. 1, the circuit caters for 96 peripheral-equipment signalling points again designated as contact units 1S to 96S converging upon a detecting device DET. However, the signalling points are organized in groups of 24 namely 1S to 24S, 25S to 48S, 49S to 72S and 73S to 96S. Instead of a single shift-register embracing all the signalling points, four 24-stage shift registers SR1, SR2, SR3 and SR4 are provided and these are appropriate to the aforesaid groups respectively.

The circuit also includes control logic CL comparable with that incorporating the toggles of FIG. 1. Also as before the circuit is connected over leads DO, DEM, ACC, SC and ROC of path CE to external control equipment providing access to the central data-processing equipment.

The modified scanner SA has three parts of which PC1 and PC2 are counters, whereas CD1 is a decoder catering for successively pulsing its 96 output leads SL1 to SL96 which serve contact units 1S to 96S respectively. During the scanning function of the circuit, pulses emanating from the scan-pulse source SC are extended via the control logic CL to the pulse-input lead SCL of the 24-state counter PC1. At each count-of-24, counter PC1 extends a pulse to the 4-state counter PC2. The counters are so arranged that for each recurrent cycle of 96 pulses received by counter PC1 the decoder CD1 applies "1" pulses to leads SL1 to SL96 singly and successively. Moreover for the periods embraced by SCL-lead pulses 1 to 24, 25 to 48, 49 to 72 and 73 to 96 of each said cycle, an appropriate pair of leads W, X, Y and Z of counter PC2 are marked by "1" conditions; the pairs so marked say leads W and Y, W and Z, X and Y and Y and X and Z respectively.

During the period when leads W and Y are marked gate G21 produces a "1" output to prime gates G31, G51 and G71 associated with shift-register SR1. With leads W and Z marked, gate G22 produces a "1" output to prime gates G32, G52 and G72 associated with shift-register SR2. With leads X and Y marked, gate G23 produces a "1" output to prime gates G33, G53 and G73 associated with shift register SR3, whereas with leads X and Z marked, gate G24 causes gate G34, G54 and G74 associated with shift register SR4 to be primed. This arrangement ensures that while contact-unit groups 1S to 24S, 25S to 48S, 49S to 72S and 73S to 96S are being scanned successively, the appropriate shift-register SR1, SR2, SR3 or SR4 respectively is active.

Leads W, X Y and Z also extend to a word-address generator WAG, associated with the control logic CL and so the identity of each currently employed shift-register (and therefore of the relevant group of 24 contact units) is made evident to that generator.

While scanning of the signalling points is taking place, pulses derived from the scan-pulse source SC are also extended by the control logic to the strobe lead STL and these pulses are connected to one input lead of gates G51, G52, G53 and G54 serving the strobe input leads of shift-registers SR1, SR2, SR3 and SR4 respectively.

It can be deduced that, due to the selective marking of the aforesaid leads W, X, Y and Z and the consequent mutually exclusive activation of gates G21, G22, G23 and G24, sequences of 24 strobe pulses are applied to shift-registers SR1, SR2, SR3 and SR4 successively during each scanning cycle. Moreover the strobe pulses of the first, second, third and fourth sequences correspond to the time-slots when contact units 1S to 24S, 25S to 48S, 49S to 72S and 73S to 96S are being individually subjected to interrogation.

It may be taken that at the end of a scanning cycle involving all the contact units 1S to 96S, the last-encountered states of units 1S to 24S are stored in stages 24 to 1 respectively of shift-register SR1, and likewise the states of units 25S to 48S, 49S to 72S and 73S to 96S are stored in shift-registers SR2, SR3 and SR4 respectively.

The detector DET associated with all the contact units has its output lead connected to one input lead of the selectively primed gates G31, G32, G33 and G34 associated with the input leads 1P of shift-registers SR1, SR2, SR3 and SR4 respectively. Moreover the output lead of the detector extends to one input lead of the exclusive-OR gate G80, the other input lead of which is controlled by the selectively-primed gates G71, G72, G73 and G74 associated with the output leads OP of shift-registers SR1, SR2, SR3 and SR4 respectively.

The exclusive-OR gate, like gate G5 of FIG. 1, is concerned with announcing to the control logic any encountered change-of-state of the various contact units and its function in this respect is related to the shift-register currently being employed as determined by the condition of leads W, X, Y and Z.

Assume now that contact units 1S to 24S are being scanned. Under these circumstances, with leads W and Y marked gate G21 relevant to shift-register SR1 is activated so that the associated gates G31, G71 and G51 are primed. Gate G31 enables signals appropriate to the encountered states of contacts 1S to 24S to be extended, over the OR gate G41, to the input lead IP of shift-register SR1 exclusively. Gate G71 enables the exclusive-OR gate G80 to compare the previously stored states of contact units 1S to 24S with the states as currently encountered. Gate G51 delivers strobe pulses to shift-register SR1 exclusively so that the latter can, on termination of each such pulse, perform its storage and advancement functions; storage being effected in respect of the encountered state of each relevant contact unit.

If no changes-of-state have been encountered when contact units 1S to 24S have been scanned, counter PC2 assumes its second state-of-count (leads W and Z marked) and as a result gate G22 is activated, so that shift-register SR2 and the associated gates G32, G72 and G52 are nominated for use in the interrogation of contact units 25S to 48S as scanning proceeds. Again the exclusive-OR gate is available during this procedure for announcing any change-of-state of an encountered contact unit.

Furthermore if no changes-of-state have been encountered when contact units 25S to 48S have been scanned, gate G23 is activated so that shift-register SR3, in conjunction with gates G33, G73 and G53, is brought into service for interrogation of contacts 49S to 72S. If no change-of-state of these contacts, is detected by gate G80, gate G24 is activated and interrogation of contact units 73S to 96S proceeds making use of shift-register SR4 in conjunction with gates G34, G74 and G54.

The scanning procedure is repetitive until a change-of-state of a contact unit is encountered. As already mentioned when a contact unit is being scanned, the condition of that contact unit as assessed on the previous scan is stored in the last stage of the pertinent shift-register. Assume that contact unit S25 is being scanned, and that it is now in the closed state whereas on the previous scan it was encountered in the open state. Under these circumstances stage 24 of shift-register SR2 has "0" (relevant to the open state) stored in it but detector DET is producing a "1" condition (relevant to the current closed state). The condition developed by the detector is extended to the input lead of shift-register SR2 preparatory to storage therein on termination of the current strobe pulse. Meantime the detector output condition "1" is applied to one input lead of the exclusive-OR gate G80, the other input lead of which is receiving "0" stage 24 of shift-register SR2. Because of the non-equivalence of the inputs of gate G80, the gate produces a "1" output condition as an announcement of the detected change-of-state. This condition is effective in the control logic to cause a signal to be applied over lead INH to inhibit the counter PC2. Accordingly counter PC2 is prevented from changing the state of the marking leads W, X, Y and Z i.e., leads W and Z appertaining to shift-register SR2 remain marked. Moreover counter PC2 maintains the decoder CD1 in such a state as to limit its activity (under control of counter PC1) to the pertinent group of contact units 25S to 48S. In addition to inhibiting counter PC2, the "1" output of the exclusive-OR gate G80 is effective upon the control logic CL in a manner corresponding to that described with reference to FIG. 1 to prepare for execution of a confirmatory scan involving the group of contact units 25S to 48S only. The present process of interrogating the remaining contact units of the last-mentioned group now proceeds and conditions appropriate to the prevailing states of those contact units (whether changed or not) are stored in relevant stages of shift-register SR2.

When all the contact units of the particular group have been subjected to the interrogation and storage procedure, the control logic is operative, in a corresponding manner to that described with reference to FIG. 1, to cause a confirmatory scan to be performed in respect of the particular contact units. When such a confirmatory scan is completed without any further change-of-state being encountered, the control logic disconnects pulses from leads SCL and STL, and extends a demand signal to lead DEM of the associated control equipment CE. When the chosen input/output unit of the data processor is ready to receive data it returns an appropriate condition to lead ACC, and the read-out pulses at lead ROC are extended, as shift-register strobe pulses, to the lead STL exclusively. Also at this juncture the control logic CL, applies a "1" condition to lead DOC and this condition is applied a) to one input lead of each of the recirculation-path gates G61, G62, G63 and G64 of the shift-registers, and b) to an input lead of gate G81 associated with the data-output lead DO.

Shift-register SR2 remains exclusively appropriated due to the sustained marking of leads W and Z by counter PC2, and transmission of the 24-bit data character, stored in that shift-register, is now effected by way of gates G72, G81 and G82 and the data-output lead DO. Transmission of this data character appertaining to contact units 25S to 48S is effected by stage-by-stage advancement of shift-register SR1, under the control of the strobe pulses. With gate G62 already primed the contents of the particular shift-register are re-circulated via gates G62 and G42 so that upon completion of transmission of the data character, the state of the shift-register SR2 is identical with that existing before commencement of transmission.

Also upon completion of transmission of the 24-bit character, the control logic activates word-address generator WAG in a manner determined by the markings still evident at two of leads W, X, Y and Z. The generator thereupon causes a short series of word-address bits (say three) to be extended from lead WA. These word-address bits are advanced over gate G82 to lead DO and serve the identity of the data-character with respect to the particular group of 24 contact units, and it may be taken that these are supplemented externally of the exception reporting circuit by other signalling bits to form a 24-bit address-character which is unique to said group.

When all of the information has been transmitted, the control equipment allows the circuit to revert to its normal scanning function.

In the particular example a change-of-state in one or more of the group of contact units 25S to 48S was assumed, and as a result shift-register SR2 was retained for the performance of the confirmatory scanning and data-character transmission sequences in respect of that group. It will be appreciated that shift registers SR1, SR3 and SR4 would be individually operative, in a corresponding manner, if a change-of-state were encountered in one of the groups of contact units 1S to 24S, 49S to 72S and 73S to 96S respectively. In each case the word-address generator WAG would be utilized in the final transmission of word-address bits appropriate to the source of the transmitted 24-bit data character.

What we claim is:

1. In or for use in a data processing system, a circuit arrangement for transmitting information which it derives from a plurality of two-state signalling points according to their states and appertaining to one or more peripheral equipments serving a data processor, characterized in that it comprises a) scanning means for sequentially and repetitively scanning said signalling points and operative to produce a signalling-point signal appropriate to the state of each signalling point at the time which it is scanned, b) a single shift-register having at least as many stages as there are signalling points and arranged to store said signalling-point signals produced by the scanner, c) comparison means controlled from the input lead and output lead of the first and last stages respectively of the shift-register for assessing each said signal when it is produced by said scanning means in relation to that signal of the relevant signalling point which was stored by the shift-register when said point was last scanned, the comparison means being arranged to generate a change-of-state signal in the event of disparity between the currently produced signal and said previously stored signal, and d) control means which is responsive to any said change-of-state signal, to condition itself on conclusion of scanning of the signalling points to cause the scanning means to perform a confirmatory scanning and storage cycle with respect to said group of signalling points, and the control means is further operative upon completion of the confirmatory scanning cycle, without intervention of a further change-of-state signal, to cause the signals currently stored in the shift-register to be transmitted over an output path, the transmitted signals comprising a series of pulses appropriate to the confirmed states of the signalling points and being derived successively from the last stage of the shift-register as a result of a series of strobe pulses being applied to that shift-register, and said control means is operative, during transmission of stored signals, to inhibit signalling-point signals and to cause the transmitted signals to be successively re-entered into the shift-register over a path, completed during transmission, between the output lead of the last stage and the input lead of the first stage.

2. In or for use in a data processing system a circuit arrangement for transmitting information which it derives from two-state signalling points arranged in a plurality of groups and incorporated in peripheral equipments serving a data processor, characterized in that it comprises a) scanning means for sequentially and repetitively scanning said signalling points in a group-after-group order and operative to produce a signalling-point signal appropriate to the state of each signalling point at the time which it is scanned, b) one identical shift-register for each group of signalling points, each said shift-register having at least as many stages as there are signalling points in the group and being arranged to store said signals produced during scanning of all the signalling points of the group, c) comparison means, controlled from the input lead and output lead of the first and last stage respectively of each shift-register, for assessing each said signal when it is produced by said scanning means in relation to that signal of the relevant signalling point which was stored by a shift-register when said point was last scanned, the comparison means being arranged to generate a change-of-state signal in the event of disparity between the currently-produced signal and said previously-stored signal, and d) control means which is responsive to any said change-of-state signal to condition itself, on conclusion of the scanning and storage functions appertaining to the particular group of signalling points, in such manner as to inhibit scanning of another group of signalling points and to cause the scanning means and the particular shift-register to re-institute the scanning and storage functions with respect to the particular group of signalling points, and the control means is further operative when said functions have been completed, without intervention of a further change-of-state signal, to cause the signals stored in the particular shift-register to be transmitted as a pulse series over an output lead concurrently with the re-entry of said signals into the shift-register over a path, completed during transmission, between the output lead of the last stage and the input lead of the first stage of the shift-register.

3. A circuit arrangement as claimed in claim 2 in which the scanning means includes a device arranged for distribution of scanning pulses to all said signalling points and also includes counting means driven from a source of regularly recurrent pulses to activate said device, and said counting means are operative at states-of-count appropriate to the scanning of each group of signalling points to activate the appropriate shift-register and to apply an identity signal appropriate to that shift-register to an address generating device, operative in conjunction with said control means on termination of transmission of said pulse series to transmit over said output lead a further pulse series which is indicative of the identity of the shift register employed in the transmission of the preceding pulse series.

* * * * *